US010421868B2

(12) United States Patent
Hibben et al.

(10) Patent No.: US 10,421,868 B2
(45) Date of Patent: Sep. 24, 2019

(54) WATER-BASED COATING COMPOSITIONS THAT RESIST DIRT PICKUP

(71) Applicant: Valspar Sourcing, Inc., Minneapolis, MN (US)

(72) Inventors: Mary Jane Hibben, Elburn, IL (US); Michael Wildman, Hoffman Estates, IL (US); T. Howard Killilea, North Oaks, MN (US); Iain Harvey, Crystal Lake, IL (US)

(73) Assignee: THE SHERWIN-WILLIAMS COMPANY, Cleveland, OH (US)

( * ) Notice: Subject to any disclaimer, the term of this patent is extended or adjusted under 35 U.S.C. 154(b) by 0 days.

(21) Appl. No.: 15/454,702

(22) Filed: Mar. 9, 2017

(65) Prior Publication Data
US 2017/0174904 A1 Jun. 22, 2017

Related U.S. Application Data

(63) Continuation of application No. PCT/US2015/049659, filed on Sep. 11, 2015.

(60) Provisional application No. 62/049,613, filed on Sep. 12, 2014.

(51) Int. Cl.
| | |
|---|---|
| C08F 2/46 | (2006.01) |
| C08F 2/50 | (2006.01) |
| C08G 61/04 | (2006.01) |
| C09D 5/02 | (2006.01) |
| C09D 7/40 | (2018.01) |
| C09D 5/14 | (2006.01) |
| C09D 133/08 | (2006.01) |
| C09D 133/10 | (2006.01) |
| C09G 1/04 | (2006.01) |
| C09D 5/08 | (2006.01) |
| C09D 121/02 | (2006.01) |
| C08K 3/22 | (2006.01) |
| C08K 5/521 | (2006.01) |

(52) U.S. Cl.
CPC .............. C09D 5/024 (2013.01); C09D 5/02 (2013.01); C09D 5/028 (2013.01); C09D 5/08 (2013.01); C09D 5/14 (2013.01); C09D 7/40 (2018.01); C09D 121/02 (2013.01); C09D 133/08 (2013.01); C09D 133/10 (2013.01); C09G 1/04 (2013.01); C08K 3/22 (2013.01); C08K 5/521 (2013.01); C08K 2003/2241 (2013.01)

(58) Field of Classification Search
CPC .......... C09D 5/024; C09D 5/08; C09D 5/028; C09D 121/02; C08K 5/521

USPC ........... 522/76, 74, 71, 1, 189, 184, 6; 520/1
See application file for complete search history.

(56) References Cited

U.S. PATENT DOCUMENTS

| | | |
|---|---|---|
| 3,214,492 A | 10/1965 | Tocker |
| 3,303,046 A | 2/1967 | Chebiniak et al. |
| 3,320,198 A | 5/1967 | Hill |
| 3,429,852 A | 2/1969 | Skoultchi |
| 4,071,645 A | 1/1978 | Kahn |
| 4,255,308 A | 3/1981 | Brasen |
| 5,248,805 A | 9/1993 | Boettcher et al. |
| 5,385,815 A | 1/1995 | Schofield et al. |
| 5,629,365 A | 5/1997 | Razavi |
| 5,780,117 A | 7/1998 | Swartz |
| 5,824,716 A | 10/1998 | Coqueret et al. |
| 5,861,232 A | 1/1999 | Kanda |
| 5,942,368 A | 8/1999 | Akiyama et al. |
| 5,990,228 A | 11/1999 | Eichman et al. |
| 6,258,887 B1 | 7/2001 | Bardman et al. |
| 6,303,188 B1 | 10/2001 | Bors et al. |
| 6,376,570 B1 | 4/2002 | Zhao et al. |
| 6,740,692 B2 | 5/2004 | Weitzel et al. |
| 6,762,230 B2 | 7/2004 | Brandenburger et al. |
| 6,930,141 B2 | 8/2005 | Gebhart et al. |
| 7,101,921 B2 | 9/2006 | Edwards et al. |
| 7,138,438 B2 | 11/2006 | Lauer et al. |
| 7,812,079 B2 | 10/2010 | Brandenburger et al. |
| 7,923,513 B2 | 4/2011 | Killilea et al. |
| 8,110,624 B2 | 2/2012 | Brandenburger et al. |
| 8,440,751 B2 | 5/2013 | Kohnke et al. |
| 8,440,752 B2 | 5/2013 | Brandenburger et al. |
| 8,507,579 B2 | 8/2013 | Sheerin et al. |
| 8,653,180 B2 | 2/2014 | Koziski et al. |
| 8,802,765 B2 | 8/2014 | Yang et al. |
| 9,120,936 B2 | 9/2015 | Hibben |
| 9,822,275 B2 | 11/2017 | Hibben et al. |
| 2002/0026006 A1 | 2/2002 | Garcia |
| 2002/0151648 A1 | 10/2002 | Fasano |
| 2002/0156163 A1 | 10/2002 | Brandenburger |
| 2002/0160205 A1 | 10/2002 | Garcia |
| 2003/0018121 A1 | 1/2003 | Weitzel et al. |

(Continued)

FOREIGN PATENT DOCUMENTS

| | | |
|---|---|---|
| CN | 1288030 A | 3/2001 |
| CN | 1670096 A | 9/2005 |

(Continued)

OTHER PUBLICATIONS

ASTM D2244-02. Standard Practice for Calculation of Color Tolerances and Color Differences from Instrumentally Measured color Coordinates. 1993. 10 pages.

(Continued)

Primary Examiner — Jessica Whiteley
(74) Attorney, Agent, or Firm — Mueting, Raasch & Gebhardt, P.A.

(57) ABSTRACT

Water-based compositions containing a low VOC coalescent, a latex or water-dispersible polymer are described.

17 Claims, No Drawings

(56) References Cited

U.S. PATENT DOCUMENTS

| | | |
|---|---|---|
| 2004/0131787 A1 | 7/2004 | Fang |
| 2005/0009954 A1 | 1/2005 | Gebhard |
| 2005/0032954 A1 | 2/2005 | Brandenburger et al. |
| 2005/0203211 A1 | 9/2005 | Gebhard |
| 2005/0215678 A1 | 9/2005 | Ludtke et al. |
| 2006/0111503 A1* | 5/2006 | Killilea ............... C08G 18/694 524/501 |
| 2006/0135684 A1 | 6/2006 | Killilea et al. |
| 2007/0110981 A1 | 5/2007 | Killilea et al. |
| 2007/0248837 A1 | 10/2007 | Hsu et al. |
| 2008/0058473 A1 | 3/2008 | Freidzon |
| 2009/0149591 A1 | 6/2009 | Yang et al. |
| 2009/0312469 A1* | 12/2009 | Koziski ............... C08G 18/12 524/147 |
| 2009/0326121 A1 | 12/2009 | Stockl et al. |
| 2010/0015360 A1 | 1/2010 | Kyota |
| 2011/0112223 A1* | 5/2011 | Yang ............... C08F 218/08 524/35 |
| 2011/0245390 A1* | 10/2011 | Yang ............... C08K 5/07 524/241 |
| 2012/0041092 A1 | 2/2012 | Bohannon |
| 2012/0129974 A1 | 5/2012 | DeNotta et al. |
| 2013/0116359 A1 | 5/2013 | Bohannon |
| 2013/0210985 A1 | 8/2013 | Brandenburger et al. |
| 2014/0256862 A1 | 9/2014 | Palmer, Jr. et al. |
| 2014/0275315 A1* | 9/2014 | Hibben ............... C09D 5/024 522/46 |
| 2014/0275388 A1 | 9/2014 | Rokowski et al. |
| 2015/0275388 A1 | 10/2015 | Yoshida et al. |
| 2016/0053127 A1 | 2/2016 | Hibben et al. |
| 2017/0029654 A1 | 2/2017 | Hibben et al. |
| 2017/0073543 A1 | 3/2017 | Joecken et al. |
| 2017/0096567 A1 | 4/2017 | Brandenburger et al. |
| 2017/0174904 A1 | 6/2017 | Hibben et al. |
| 2017/0327709 A1 | 11/2017 | Sandoval et al. |
| 2018/0016376 A1 | 1/2018 | Belowich et al. |
| 2018/0148595 A1 | 5/2018 | Hibben et al. |

FOREIGN PATENT DOCUMENTS

| | | | |
|---|---|---|---|
| EP | 0010000 A1 | | 4/1980 |
| EP | 2133376 A1 | | 12/2009 |
| FR | 2786777 A1 | | 12/1998 |
| GB | 1189560 | * | 5/1968 |
| JP | 4117461 A | | 4/1992 |
| WO | WO 94/000524 A1 | | 1/1994 |
| WO | WO 99/58608 A1 | | 11/1999 |
| WO | WO 00/06643 A1 | | 2/2000 |
| WO | WO 02/068547 A1 | | 9/2002 |
| WO | WO 2005/097917 A1 | | 10/2005 |
| WO | WO 2006/065914 A1 | | 6/2006 |
| WO | WO 2007/087458 A1 | | 8/2007 |
| WO | WO 2010/008713 A1 | | 1/2010 |
| WO | WO 2011/145024 A2 | | 11/2011 |
| WO | WO 2012/028627 A1 | | 3/2012 |
| WO | WO 2013/138209 A1 | | 9/2013 |
| WO | WO 2014/149756 A1 | | 9/2014 |
| WO | WO 2018/032410 A1 | | 2/2018 |

OTHER PUBLICATIONS

ASTM D2369-90. Standard Test Method for Volatile Content of Coatings. 1990. 5 pages.

ASTM D3960-02. Standard Practice for Determining Volatile Organic Compound (VOC) Content of Paints and Related Coatings. 2002. 8 pages.

ASTM D6886-12. Standard Test Method for Determination of the Individual Volatile Organic Compounds (VOCs) in Air-Dry Coatings by Gas Chromatography. 2012. 7 pages.

"High Lights! Radiation curing with resins and photoinitiators for industrial coatings and graphic arts: Laromer®, Irgacure®, Lucirin®, Darocur®." BASF SE, Lufwigshafen, Germany [retrieved on Aug. 6, 2014]. Retrieved from the Internet:<URL: http://www.basf.com/group/corporate/en_GB/literaturedocument:/Brand+Darocur-Brochure--High+lights+Radiation+curing+with+resins+and+photoinitiators+for+industrial+coatings+and+graphic+arts+Laromer+Irgacure+Lucirin+Darocur-English.pdf>; 44 pages.

International Search Report (PCT/ISA/210) and Written Opinion (PCT/ISA/237), dated Jun. 18, 2014, in connection with Patent Application No. PCT/US2014/020719, filed Mar. 5, 2014; 13 pgs.

EPA, Technical Overview of Volatile Organic Compounds, 2009.

TCEQ, 2,2,4-trimethyl 1,3 pentanediol monoisobutyrate, Texas Commission on Environmental quality, 2013.

International Search Report and Written Opinion dated Jan. 6, 2016, in connection with Patent Application No. PCT/US2015/049659, filed Sep. 11, 2015; 14 pgs.

European Patent Application No. 15 84 7438.7 filed Mar. 9, 2017; Partial Supplementary European Search Report and Opinion dated Apr. 19, 2018; 11 pages.

International Preliminary Report on Patentability, dated Sep. 24, 2015, in connection with Patent Application No. PCT/US2014/020719, filed Mar. 5, 2014; 10 pgs.

International Preliminary Report on Patentability, dated Jan. 6, 2016, in connection with Patent Application No. PCT/US2015/049659, filed Sep. 11, 2015; 8pgs.

* cited by examiner

WATER-BASED COATING COMPOSITIONS THAT RESIST DIRT PICKUP

CROSS-REFERENCE TO RELATED APPLICATION(S)

This application is a continuation of International Application No. PCT/US2015/049659 filed 11 Sep. 2015, which claims priority from U.S. Provisional Application No. 62/049,613, filed Sep. 12, 2014, each of which is incorporated herein by reference in its entirety.

BACKGROUND

Water-based compositions, e.g., coating compositions such as paints, that include latex polymer particles or water-dispersible polymer particles typically also include a coalescent (i.e., coalescing agent or film-forming agent) in addition to pigments and fillers, for example. The coalescent functions as a solvent as well as a plasticizer for the polymer particles (to soften the polymer particles and assist in the formation of a continuous coating or film, for example, after applying it to a surface and allowing it to dry).

Useful coalescents are generally stable in the presence of water, compatible with other ingredients typically used in paint formulations, particularly the polymers particles, such that the stability of the water-based composition is not compromised. They are also typically sufficiently volatile to escape when the applied composition is allowed to dry, but sufficiently nonvolatile to evaporate more slowly than other ingredients (e.g., drying retarders, antifreezes) that delay film formation. However, there is a general desire in the industry to reduce volatile organic emissions, thereby reducing the environmental and health concerns.

Governments have established regulations setting forth guidelines relating to volatile organic compounds (VOC) that may be released into the atmosphere. To reduce the level of VOC, new high solids coating compositions have been developed as well as powder coating compositions that do not include volatile compounds, have a reduced concentration of VOC, or incorporate compounds having a lower volatility. Reducing the volatility of coalescents, solvents, plasticizers, etc. can adversely affect the balance of properties needed in a latex-based coating composition, however. Thus, there is a need for coalescents, solvents, plasticizers, etc. used in coating compositions such as paint that do not compromise stability, compatibility, film formation ability, or the desirable properties of the applied coating, etc.

SUMMARY

The present disclosure provides water-based compositions, such as coating compositions, containing a low VOC coalescent, a latex polymer or water-dispersible polymer, and a water-insoluble ultraviolet absorber, and methods of making such compositions.

In one aspect of the present disclosure, a low VOC paint is described, the paint including a latex polymer, a pigment, and at least one coalescent having the formula: $(R^1—O)_n—P(=O)—[—O—(X)_m—O—R^2]_{3-n}$ wherein: $R^1$ and $R^2$ are each independently H, an aliphatic group having at least 3 and less than 100 carbon atoms, an aromatic group having at least 3 and less than 100 carbon atoms; X is a divalent hydrocarbyl group having at least one and no more than 12 carbon atoms (preferably 2 to 8 carbon atoms); m is an integer between 0 and 15 (preferably 1 to 3); and n is an integer between 0 and 3, with th proviso that $R^1$ and $R^2$ together do not include any aliphatic unsaturated carbon-carbon bonds. The coalescent has a volatile organic content of less than about 15 wt %, is nonreactive in the paint, and is dispersible in the paint to form a uniform mixture, and the paint contains sufficient $TiO_2$ pigment to be substantially visually opaque when applied at a thickness of 3 mil (0.0762 mm) and dried.

In another aspect of the present disclosure, a method for preparing a water-based composition wherein the method includes providing an aqueous polymer including a latex or water-dispersible polymer in water, providing an additive package including at least one pigment, a thickener, a mildewcide, a biocide, a defoamer, a surfactant, a dispersant, a filler, and combinations thereof, providing one or more ultraviolet asborbers capable of absorbing UV radiation within a range of 240-400 nm, and providing one or more low VOC coalescents having a volatile organic content of 30% or less. This is followed by the step of dissolving the one or more water-insoluble ultraviolet absorbers in the one or more low VOC coalescents to form a UV-absorber-coalescent solution, then mixing the aqueous polymer with the additive package. Then, either before or after mixing the aqueous polymer with the additive package, the UV-absorber-coalescent solution is mixed with the aqueous polymer, the additive package, or both to form a water-based coating composition or paint. The present disclosure also provides a water-based composition or paint prepared by a method as described herein.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawings and the description below. Other features, objects, and advantages of the invention will be apparent from the description and drawings, and from the claims.

SELECTED DEFINITIONS

Unless otherwise specified, the following terms as used herein have the meanings provided below.

The term "latex" means a dispersion of polymer particles in water; a latex polymer typically requires a secondary dispensing agent (e.g., a surfactant) for creating a dispersion or emulsion of polymer particles in water having at least one-month shelf stability at normal storage temperatures.

The term "dispersible" in the context of a dispersible coalescent means that the coalescent can be mixed into the coating composition to form a uniform mixture without the use of high shear mixing.

The term "stable" in the context of a coating composition containing a dispersible coalescent means that the coalescent does not phase separate from the coating composition on standing at 120° F. (49° C.) for four weeks.

The terms "volatile organic content" and "VOC" herein mean the volatility of a compound as measured by ASTM D2369-10e1 (Standard Test Method for Volatile Content of Coatings).

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups. The term "Ar" refers to a divalent aryl group (i.e., an arylene group), which refers to a closed aromatic ring or ring system such as phenylene, naphthylene, biphenylene, fluorenylene, and indenyl, as well as heteroarylene groups (i.e., a closed ring hydrocarbon in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "heteroarylene" groups (e.g., furylene, pyridylene, etc.)

A group that may be the same or different is referred to as being "independently" something. Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

The term "double bond" is non-limiting and refers to any type of double bond between any suitable atoms (e.g., C, O, N, etc.).

The term "triple bond" is non-limiting and refers to any type of triple bond between any suitable atoms.

Unless otherwise indicated, a reference to a "(meth) acrylate" compound (where "meth" is bracketed) is meant to include both acrylate and methacrylate compounds.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5 , etc.). Furthermore, disclosure of a range includes disclosure of all subranges included within the broader range (e.g., 1 to 5 discloses 1 to 4, 1.5 to 4.5, 1 to 2 , etc.).

DETAILED DESCRIPTION

The present disclosure provides water-based compositions, such as coating compositions, particularly paints, containing a low VOC coalescent, a latex or a water-dispersible polymer, and a water-insoluble ultraviolet absorber. Preferably, the water-based compositions are in the form of paints, although sealers, caulks, and sealants are within the scope of the present disclosure.

The water-based compositions or paints of the present disclosure are advantageous in that they have a relatively low volatile organic content without sacrificing the balance of properties desired for an applied (i.e., dry) composition, such as a coating of paint. Governments have established regulations setting forth guidelines relating to volatile organic compounds (VOC) that may be released into the atmosphere. Such regulations vary from region to region, but the most stringent regulations are in the south coast region (e.g., Los Angeles County and Orange County, Calif.). Such regulations also vary by product. For example, clear topcoats can have no more than 200 grams per liter (g/L), water-home coatings can have no more than 50 g/L VOC, pigmented lacquers can have no more than 275 g/L VOC.

Reducing the volatility of coalescents, solvents, plasticizers, etc. can adversely affect the balance of properties needed in water-based compositions, especially with respect to dirt pick-up. Thus, there is a need for compositions that possess desirable stability, compatibility, film formation ability, low dirt pick-up, etc.

Compositions of the present disclosure possess these properties while possessing low total VOC in the water-based compositions. In certain embodiments, the water-based compositions include no greater than 25 grams per 100 grams polymer solids, or no greater than 20 grams per 100 grams polymer solids, or no greater than 15 grams per 100 grams polymer solids, or no greater than 10 grams per 100 grams polymer solids, or no greater than 5 grams per 100 grams polymer solids, or no greater than 2 grams per 100 grams polymer solids. Stated another way, in certain embodiments wherein the water-based compositions of the present disclosure are paints, they include no greater than 25 grams per liter of paint, or no greater than 20 grams per liter of paint, or no greater than 15 grams per liter of paint, or no greater than 10 grams per liter of paint.

Ultraviolet Absorbers (Photoinitiators)

Suitable ultraviolet absorbers are water-insoluble ultraviolet absorbers. By this it is meant that the compounds will not dissolve to an appreciable extent in water at the temperatures typically used for preparing water-based compositions as described herein. Suitable ultraviolet absorbers are capable of absorbing UV radiation within a range of 240 to 400 nm. For certain embodiments, they are capable of absorbing UV radiation in the 280 to 400 nm range, and for certain embodiments in the 315 to 375 nm range. Herein, the ultraviolet absorbers do not form a bond to the polymer, although they are capable of generating a radical through a hydrogen-abstraction mechanism by absorbing UV radiation. Although not wishing to be bound by theory, it may be that this results in surface crosslinking of the polymer. Examples of suitable ultraviolet absorbers or photoinitiators for the methods and compositions described herein are further described in Applicant's U.S. patent application Ser. No. application Ser. No. 14/197,752, filed Mar. 5, 2014, issued as U.S. Pat. No. 9,120,936, including methyl-o-benzoyl-benzoate available under the trade name GENO-CURE MBB from Rahn USA, Aurora, IL.

Coalescents

Preferably, the coating compositions include one or more compounds having a relatively low volatile organic content (VOC), and more preferably, a relatively low molecular weight. Typically, the volatile organic content, as determined by ASTM method D2369-90, is 50% or less, 30% or less, 20% or less, 15% or less, 11% or less, or 10% or less, based on the original weight of the coalescent. Preferably, the number average molecular weights of such compounds are 750 or less, and more preferably, 500 or less.

Such compounds are preferably good coalescents. That is, they advantageously provide good film forming properties for the latex or water-dispersible polymer particles.

In certain embodiments, suitable low VOC coalescents assist in the formation of a continuous coating or film from the latex or water-dispersible particles after applying a coating composition containing such particles (e.g., a paint) to a surface and allowing it to dry (preferably, while not reacting with the polymer particles) at room temperature for at least 7 days.

In certain embodiments, a particularly desirable group of low VOC coalescents are those that provide good film forming properties at low temperatures (e.g., below room temperature). Preferably, such compounds facilitate the formation of polymer films of the polymer particles at a temperature of less than 25° C. (more preferably, at a temperature of 4° C. to 10° C., and most preferably, at a temperature of 4° C. to 5° C.).

Suitable coalescents are dispersible in the water-based compositions, which are preferably stable over time. By this it is meant, the coalescent does not phase separate from the water-based composition upon standing at 49° C. for four weeks.

In certain embodiments, suitable low VOC coalescents are compatible with the polymer and other components in the system. That is, they are nonreactive in the composition. In certain embodiments, they are not cross linkers of the polymer or otherwise reactive with the polymer.

The low VOC coalescents can optionally also function as plasticizers and/or solvents. In particular, suitable low VOC coalescents are those that can function as solvents for the ultraviolet absorbers.

In certain embodiments, such low VOC coalescents are of the formula:

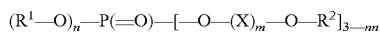

wherein: $R^1$ and $R^2$ are each independently an organic group having at least 3 and less than 100 carbon atoms, an aromatic group having at least 6 and less than 100 carbon atoms; X is a divalent organic group having at least one and no more than 12 carbon atoms (preferably 2 to 8 carbon atoms); m is an integer between 0 and 15 (preferably 1 to 13); and n is an integer between 0 and 3, with the proviso that $R^1$ and $R^2$ together do not include any aliphatic unsaturated carbon-carbon bonds.

In certain embodiments, $R^2$ is hydrogen, an alkyl group having 2 to 8 carbon atoms, an unsubstituted aryl group having at least 6 carbon atoms, or an aryl group substituted with an alkyl group having at least one and no more than 10 carbon atoms; X is a divalent hydrocarbyl group having at least one and no more than 8 carbon atoms; m is an integer between 0 and 13; and n is 0, 1 or 2.

In certain embodiments, le is an unsubstituted aryl group with at least 6 carbon atoms; $R^2$ is an alkyl group having at least one and no more than 6 carbon atoms; X is a divalent hydrocarbyl group having at least one and no more than 8 carbon atoms; m is an integer between 0 and 13; and n is not zero.

In certain embodiments, $R^1$ is an unsubstituted aryl group with at least 6 carbon atoms; $R^2$ is an aryl group substituted with an alkyl group having at least one and no more than 6 carbon atoms, or $R^2$ is an alkyl group having at least one and no more than 10 carbon atoms; m is zero and n is not zero.

In a preferred embodiment, the coalescent described herein has the following formula:

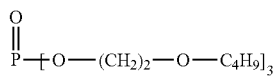

wherein $R^2$ is a butyl group, X is —$CH_2$—; m is 2; and n is 0.

Examples of preferred low VOC coalescents as described herein include, without limitation, tributyl phosphate, tris (butoxyethyl)phosphate, isopropylated triphenyl phosphate, alkyl diphenyl phosphate, triaryl phosphate ester, t-butylated triphenyl phosphate, 2-ethylhexyl diphenyl phosphate, isodecyl diphenyl phosphate, linear alkyl diphenyl phosphate, mixtures or combinations thereof, and the like.

These compounds can be formed using standard organic synthesis techniques, which are well known to one of skill in the art.

The amount of the one or more low VOC coalescents present in the water-based compositions of the present disclosure includes an amount that provides the desired result. Preferably, one or more relatively low VOC coalescents, are present in a water-based composition in an amount of at least 1 wt-%, or at least 2 wt-%, or at least 3 wt-%, or at least 4 wt-%, or at least 5 wt-%, based on polymer solids. Preferably, one or more relatively low VOC coalescents are present in a water-based composition in an amount of up to 20 wt-%, up to 10 wt-%, based on polymer solids. When mixtures of such coalescents are used, the numerical values of the variables in the formulas described herein are averages.

Polymers

The preferred polymers of the latex-based compositions of the present disclosure include latex or water-dispersible polymers. These are well known in the paint art and are typically particles emulsified or suspended in an aqueous medium.

Suitable polymers are thermoplastic polymers with a relatively high molecular weight (e.g., 50,000 to greater than 1,000,000 Daltons). The polymers can have a wide range of glass transition temperatures, depending on the desired properties of the resultant coating.

For example, suitable polymers include those that have at least one Tg within a range of −20° C. to 70° C., preferably −20° C. to 60° C., more preferably 0° C. to 50° C.

A variety of latex polymers may be employed in the disclosed compositions including (meth)acrylics, vinyls, oil-modified polymers, polyesters, polyurethanes, polyamides, chlorinated polyolefins, and mixtures or copolymers thereof. Latex polymers are readily synthesized at modest cost, and are typically prepared through chain-growth polymerization, using one or more ethylenically unsaturated compounds (preferably monomers). Non-limiting examples of olefinic compounds which may be used to prepare latex polymers include ethylene, butadiene, propene, butene, iso-butene, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxypropyl acrylate, hydroxybutyl acrylate, hydroxybutyl methacrylate, glycidyl methacrylate, 4-hydroxybutyl acrylate glycidylether, acrylamide, methylacrylamide, styrene, a-methyl styrene, vinyl toluene, vinyl acetate, vinyl propionate, allyl methacrylate, acetoacetyl ethyl methacrylate (AAEM), diacetone acrylamide, dimethylaminomethacrylate, diethylaminomethacrylate, N-hydroxy(meth)acrylamide, vinyl ether maleate, vinyl esters of VERSATIC acid (VERSATIC acid is a synthetic saturated monocarboxylic acid of highly branched structure containing about 5 to about 10 carbon atoms), and mixtures thereof.

In certain embodiments, latex polymers include, for example, the polymerization products of ethylenically unsaturated monomers, such as acrylic acid, alkyl and alkoxy acrylates or methacrylates, vinyl esters of saturated carboxylic acids, monoolefins, conjugated dienes, optionally with one or more monomers, such as, for example, styrene, methyl methacrylate, butyl acrylate, 2-ethylhexyl acrylate, vinyl acetate, styrene, acrylonitrile, and vinyl chloride.

In certain embodiments, the latex polymer particles include a homopolymer or copolymer including at least one of an acrylate or a methacrylate. In a preferred aspect, the latex polymer particles include a homopolymer of acrylic acid, and the polymer used in the methods described herein is an acrylic latex.

Exemplary commercially available latex polymers include AIRFLEX EF811 (available from Air Products), EPS 2533, EPS 2757, EPS 2792, EPS 2705(available from EPS/CCA) and NEOCAR 2300, NEOCAR 820 and NEOCAR 2535 (Neocars are now Arkema), RHOPLEX VSR 50, RHOPLEX VSR 2015, (available from Dow Chemical Co.), Optive 130 and OPTIVE 230 from BASF. Other exemplary latex polymers include the latex polymers described in U.S. patent application No. US 2007/0110981 A1.

Surfactants suitable for use with latex polymers include, for example, sodium lauryl sulfate, sodium laureth sulfate (DISPONIL series from BASF), sodium dodecyl benzene sulfonate, RHODAFAC RE 610, RHODAFAC RS 410, RHODAVAC RS 610, RHODAVAC RS 710, ABEX EP 100, ABEX EP 110 (RhodiaSolvay), POLYSTEP B1, POLYSTEP B330 (Stepan, Northfield, Ill.), sodium dioctyl sulfosuccinate, and the like.

Suitable water-dispersible polymers include polyurethanes, epoxies, polyamides, chlorinated polyolefins, acrylics, oil-modified polymers, polyesters, and mixtures or copolymers thereof, for example. Such polymers are readily synthesized and made to be water dispersible using conventional techniques. For example, the incorporation of amine or acid functionality produces water dispersibility.

Oil-modified polymers can also be used if desired. Such polymers are readily synthesized and can be made to be water-dispersible using conventional techniques. As used herein, oil-modified polymers are broadly defined to include polymers that contain oils and/or oil based derivatives such as glyceride oils (monoglycerides, diglycerides, and the like), fatty acids, fatty amines, and mixtures thereof. Examples of such oil-modified polymers include, alkyds, oil-modified polyurethanes, oil-modified epoxies, oil-modified polyamides, oil-modified acrylics, and mixtures or copolymers thereof. Preferably, the oil-modified polymer is an oil-modified polyurethane or an alkyd.

Suitable polymers also include multi-stage latexes (i.e., those with more than one Tg). In such polymers, generally, there is a hard and a soft phase so the Tg peaks could be −30° and +100° in the same polymer mixture. Frequently these polymers are referred to as core-shell, but could also be other morphologies like "raspberry-like" or "acorn-like." In an embodiment, where the polymer used in the methods described herein is a multistage latex having at least a first stage and a second stage, the first stage preferably has a Tg of about 0° to 70° C. and the second stage preferably has a Tg of about −20° C. to 0° C.

Suitable polymers also include "gradient" polymers in which there is a water-based changing composition (or Tg) during polymerization. Often these types of polymers will not exhibit a sharp inflection point corresponding to a Tg when measured by DSC.

The amount of the latex or water-dispersible polymers present in the coating compositions of the present disclosure includes an amount that provides the desired result. Preferably, one or more polymers is used in an amount of at least 10 wt-%, based on 10-25% solids of the paint for flats and 15-35% for semi-gloss paints. Preferably, one or more polymers is present in an amount of up to 25 wt-%, based on solids.

The amount of the polymers is dependent upon the type of product, and if a paint, the finish of the paint. For example, a flat paint may have a lower percentage of polymer than satin or semi-gloss sheens, in general.

Optional Additives

Other components of the coating compositions of the present disclosure include those typically used in paint formulations, such as pigments (in a pigment grind), fillers, thickeners, biocides, mildewcides, surfactants, dispersants, defoamers, and the like. The coating compositions can be made using standard techniques known in the paint industry. Typical PVC (pigment volume concentrations) ranges for flat paints are 35-75 and for semi-gloss are 20-40.

The types of additives that can be incorporated into a water-based composition of the present disclosure depends on the use of the composition. For example, a paint includes one or more pigments (referred to as a pigment grind). A sealer typically may just include a defoamer and possibly a surfactant. A caulk or sealant includes similar additives to that of a paint.

In certain embodiments, a paint contains sufficient $TiO_2$ pigment to be substantially visually opaque when applied at a thickness of 3 mils (0.0762 mm) and dried.

In certain embodiments, a paint made as described herein is capable of coalescence at low temperature, i.e. at 40° F. or less. In embodiments, a paint made as described herein is capable of forming a dry film that is scrub-resistant and corrosion-resistant.

Methods

The UV absorber(s) can be incorporated into the compositions by first dissolving it in one or more low VOC coalescents in which it is soluble, and mixing the resulting solution either with the pigment premix (i.e., pigment grind) and/or the polymer particles, or completed pigment/polymer mixture. Preferably, it is added to the pigment premix or the polymer particles. More preferably, it is added to the polymer particles.

Thus, herein the water-based compositions can be prepared by a method that includes: providing an aqueous polymer comprising a latex or water-dispersible polymer in water; providing an additive package comprising at least one of a pigment, a thickener, a mildewcide, a biocide, a defoamer, a surfactant, a dispersant, a filler, and combinations thereof; providing one or more water-insoluble ultraviolet absorbers capable of absorbing UV radiation within a range of 240-400 nm; providing one or more low VOC coalescents having a volatile organic content of 30% or less; dissolving the one or more water-insoluble ultraviolet absorbers in the one or more low VOC coalescents to form a UV-absorber-coalescent solution; mixing the aqueous polymer with the additive package; and before or after mixing the aqueous polymer with the additive package, the UV-absorber-coalescent solution is mixed with the aqueous polymer, the additive package, or both to form a water-based coating.

That is, the UV-absorber-coalescent solution can be mixed with the aqueous polymer, or with the additive package, or with both before mixing the aqueous polymer with the additive package together. Alternatively, the aqueous polymer and additive package can be mixed together and then the UV-absorber-coalescent solution can be added to it.

A preferred method involves mixing the UV-absorber coalescent solution with the aqueous polymer and subsequently mixing the aqueous polymer (having the UV-absorber-coalescent therein) with the additive package.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A low VOC paint, comprising:
   a multistage latex polymer comprising a surfactant and polymer particles comprising a homopolymer or copolymer and including at least one of an acrylate or a methacrylate with a first stage having a Tg of about 0° C. to 70° C. and a second stage having a Tg of about −20° C. to 0° C.;
   methyl-o-benzoyl benzoate;
   a pigment; and
   at least one coalescent having the formula:

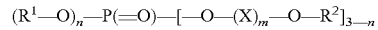

wherein:
   $R^1$ and $R^2$ are each independently H, an aliphatic group having at least 3 and less than 100 carbon atoms, an aromatic group having at least 3 and less than 100 carbon atoms;
   X is a divalent hydrocarbyl group having at least one and no more than 12 carbon atoms;
   m is an integer between 0 and 15; and
   n is an integer between 0 and 3,
   with the proviso that $R^1$ and $R^2$ together do not include any aliphatic unsaturated carbon-carbon bonds;
   wherein the coalescent has a volatile organic content of less than about 15 wt %, is nonreactive in the paint, and is dispersible in the paint to form a uniform mixture.

2. The paint of claim 1, wherein the paint forms a coalesced film at a temperature of about 4° C. to about 10° C.

3. The paint of claim 1, wherein the coalescent has a volatile organic content of no greater than about 11 wt % and has a number average molecular weight of less than about 500.

4. The paint of claim 1, wherein:
   n is 0;
   $R^2$ is an aliphatic group having 3 to 12 carbon atoms;
   X is a divalent hydrocarbyl group having at least one and no more than 12 carbon atoms; and
   m is an integer between 0 and 13.

5. The paint of claim 4, wherein n is 0, $R^2$ is —$C_4H_9$; X is —$CH_2$—; and m is 2.

6. The paint of claim 2, wherein the coalescent has the following structure:

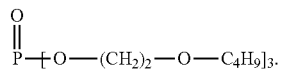

7. The paint of claim 1, comprising a mixture of coalescents, wherein the mixture has VOC of less than about 50 wt % and wherein at least one of the coalescents is nonreactive in the paint, has a VOC of less than about 15 wt %, is dispersible in the paint to form a uniform mixture, and has the recited formula; and wherein the mixture of coalescents is selected to facilitate, and used in an amount that facilitates, the formation of a polymer film of the latex polymer at a temperature of less than 25° C.

8. The paint of claim 1, wherein the at least one coalescent is selected from tributyl phosphate, tris(butoxyethyl) phosphate, isopropylated triphenyl phosphate, alkyl diphenyl phosphate, triaryl phosphate ester, t-butylated triphenyl phosphate, 2-ethylhexyl diphenyl phosphate, isodecyl diphenyl phosphate, linear alkyl diphenyl phosphate, and mixtures thereof.

9. The paint of claim 1, wherein a dried coating made from the paint demonstrates scrub resistance of at least that of TEXANOL.

10. The paint of claim 1, wherein a dried coating made from the paint demonstrates corrosion resistance.

11. The paint of claim 9, wherein the paint is stable over time.

12. The paint of claim 9, wherein the one or more coalescents are present in a sufficient amount to facilitate the formation of a polymer film of a latex polymer at a temperature less than 25° C.

13. A low VOC paint, comprising:
a multistage latex polymer comprising a surfactant and polymer particles comprising a homopolymer or copolymer and including at least one of an acrylate or a methacrylate with a first stage having a Tg of about 0° C. to 70° C. and a second stage having a Tg of about −20° C. to 0° C.;
methyl-o-benzoyl benzoate;
a pigment; and
at least one coalescent having the formula:

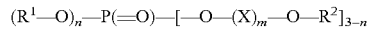

wherein:
$R^1$ and $R^2$ are each independently H, an aliphatic group having at least 3 and less than 100 carbon atoms, an aromatic group having at least 3 and less than 100 carbon atoms;
X is a divalent hydrocarbyl group having at least one and no more than 12 carbon atoms;
m is an integer between 0 and 15; and
n is an integer between 0 and 3,
with the proviso that $R^1$ and $R^2$ together do not include any aliphatic unsaturated carbon-carbon bonds;

wherein the coalescent has a volatile organic content of less than about 15 wt %, is nonreactive in the paint, and is dispersible in the paint to form a uniform mixture; and wherein the one or more coalescents are present in a sufficient amount to facilitate the formation of a polymer film of the multistage latex polymer at a temperature less than 25° C.

14. The paint of claim 13, wherein the coalescent has a volatile organic content of no greater than about 11 wt % and has a number average molecular weight of less than about 500.

15. The paint of claim 13, wherein:
n is 0;
$R^2$ is an aliphatic group having 3 to 12 carbon atoms;
X is a divalent hydrocarbyl group having at least one and no more than 12 carbon atoms; and
m is an integer between 0 and 13.

16. The paint of claim 13, comprising a mixture of coalescents, wherein the mixture has VOC of less than about 50 wt % and wherein at least one of the coalescents is nonreactive in the paint, has a VOC of less than about 15 wt %, is dispersible in the paint to form a uniform mixture, and has the recited formula; and wherein the mixture of coalescents is selected to facilitate, and used in an amount that facilitates, the formation of a polymer film of the latex polymer at a temperature of less than 25° C.

17. The paint of claim 13, wherein the at least one coalescent is selected from tributyl phosphate, tris(butoxyethyl) phosphate, isopropylated triphenyl phosphate, alkyl diphenyl phosphate, triaryl phosphate ester, t-butylated triphenyl phosphate, 2-ethylhexyl diphenyl phosphate, isodecyl diphenyl phosphate, linear alkyl diphenyl phosphate, and mixtures thereof.

* * * * *